US 8,057,357 B2

(12) United States Patent
Kimura et al.

(10) Patent No.: US 8,057,357 B2
(45) Date of Patent: Nov. 15, 2011

(54) POWER OUTPUT APPARATUS, CONTROL METHOD OF POWER OUTPUT APPARATUS, AND VEHICLE EQUIPPED WITH POWER OUTPUT APPARATUS

(75) Inventors: Akihiro Kimura, Toyota (JP); Kentaro Haruno, Toyota (JP); Takeshi Aoki, Nishio (JP); Atsushi Kayukawa, Anjo (JP); Shoji Nagata, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 492 days.

(21) Appl. No.: 12/439,580

(22) PCT Filed: Oct. 10, 2007

(86) PCT No.: PCT/JP2007/069771
§ 371 (c)(1),
(2), (4) Date: Mar. 2, 2009

(87) PCT Pub. No.: WO2008/047649
PCT Pub. Date: Apr. 24, 2008

(65) Prior Publication Data
US 2009/0258755 A1 Oct. 15, 2009

(30) Foreign Application Priority Data
Oct. 11, 2006 (JP) .................. 2006-277631

(51) Int. Cl.
F16H 59/78 (2006.01)
B60W 10/08 (2006.01)
(52) U.S. Cl. .......................................... 477/98; 477/107

(58) Field of Classification Search ................. 477/3, 98, 477/107
See application file for complete search history.

(56) References Cited

U.S. PATENT DOCUMENTS
7,101,309 B2   9/2006 Ozeki et al.
2004/0249518 A1 12/2004 Okoshi et al.
2006/0166778 A1  7/2006 Tabata et al.

FOREIGN PATENT DOCUMENTS
DE  10 2005 003881 A1   7/2006
JP      07-076229 A       3/1995
JP    2000-227150 A       8/2000
JP    2001-112101 A       4/2001
JP    2003-065102 A       3/2003
JP    2004-136877 A       5/2004
JP    2005-086919 A       3/2005
JP    2006-325367 A      11/2006

OTHER PUBLICATIONS
Extended EP Search Report of EP 07 82 9509.4 dated Apr. 6, 2011.

Primary Examiner — Edwin A Young
(74) Attorney, Agent, or Firm — Kenyon & Kenyon LLP

(57) ABSTRACT

An object oil temperature is determined by adopting a gradual change process for an oil temperature of a cooling lubricant oil, which is used to lubricate and cool down a motor and a transmission constructed to cause an output power of the motor to be subjected to speed change and to be transmitted to a driveshaft. A load factor of the motor is subsequently set based on the set object oil temperature and a motor coil temperature. A motor torque command is set with the load factor, and the motor is then driven and controlled to ensure output of a torque equivalent to the set motor torque command. This arrangement drives and controls the motor with consideration of the oil temperature of the cooling lubricant oil and thus ensures more adequate actuation of the motor, compared with a conventional drive control without consideration of the oil temperature of the cooling lubricant oil.

7 Claims, 7 Drawing Sheets

FIG. 3

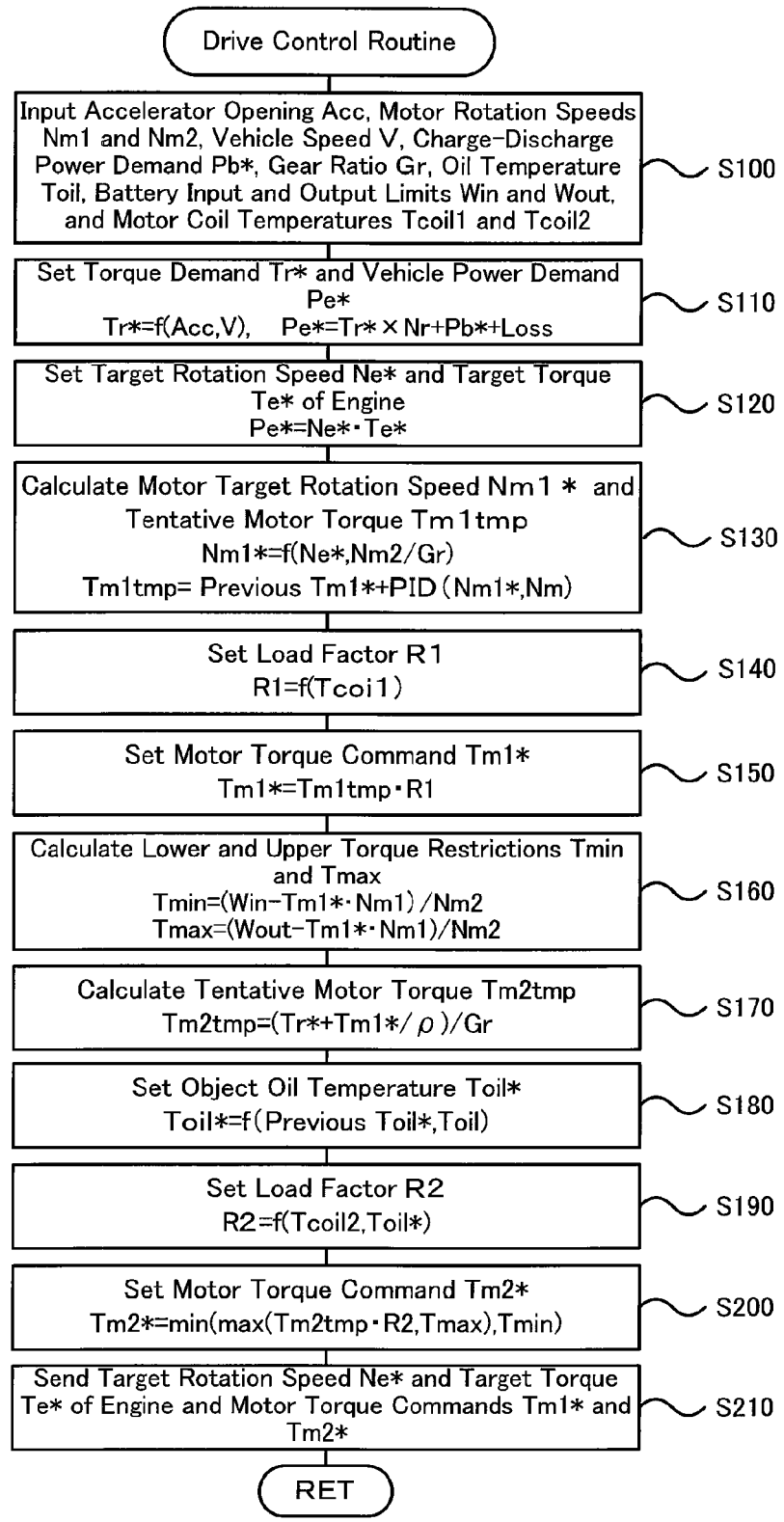

```
         ┌─────────────────────┐
         │ Drive Control Routine│
         └─────────────────────┘
                    │
┌──────────────────────────────────────────────┐
│ Input Accelerator Opening Acc, Motor Rotation│
│  Speeds Nm1 and Nm2, Vehicle Speed V,        │  S100
│  Charge-Discharge Power Demand Pb*, Gear     │
│  Ratio Gr, Oil Temperature Toil, Battery     │
│  Input and Output Limits Win and Wout, and   │
│  Motor Coil Temperatures Tcoil1 and Tcoil2   │
└──────────────────────────────────────────────┘
```

- S100: Input Accelerator Opening Acc, Motor Rotation Speeds Nm1 and Nm2, Vehicle Speed V, Charge-Discharge Power Demand Pb*, Gear Ratio Gr, Oil Temperature Toil, Battery Input and Output Limits Win and Wout, and Motor Coil Temperatures Tcoil1 and Tcoil2

- S110: Set Torque Demand Tr* and Vehicle Power Demand Pe*
  $Tr* = f(Acc, V)$, $Pe* = Tr* \times Nr + Pb* + Loss$

- S120: Set Target Rotation Speed Ne* and Target Torque Te* of Engine
  $Pe* = Ne* \cdot Te*$

- S130: Calculate Motor Target Rotation Speed Nm1* and Tentative Motor Torque Tm1tmp
  $Nm1* = f(Ne*, Nm2/Gr)$
  $Tm1tmp = \text{Previous } Tm1* + PID(Nm1*, Nm)$

- S140: Set Load Factor R1
  $R1 = f(Tcoil1)$

- S150: Set Motor Torque Command Tm1*
  $Tm1* = Tm1tmp \cdot R1$

- S160: Calculate Lower and Upper Torque Restrictions Tmin and Tmax
  $Tmin = (Win - Tm1* \cdot Nm1)/Nm2$
  $Tmax = (Wout - Tm1* \cdot Nm1)/Nm2$

- S170: Calculate Tentative Motor Torque Tm2tmp
  $Tm2tmp = (Tr* + Tm1*/\rho)/Gr$

- S180: Set Object Oil Temperature Toil*
  $Toil* = f(\text{Previous } Toil*, Toil)$

- S190: Set Load Factor R2
  $R2 = f(Tcoil2, Toil*)$

- S200: Set Motor Torque Command Tm2*
  $Tm2* = \min(\max(Tm2tmp \cdot R2, Tmax), Tmin)$

- S210: Send Target Rotation Speed Ne* and Target Torque Te* of Engine and Motor Torque Commands Tm1* and Tm2*

RET

POWER OUTPUT APPARATUS, CONTROL METHOD OF POWER OUTPUT APPARATUS, AND VEHICLE EQUIPPED WITH POWER OUTPUT APPARATUS

This is a 371 national phase application of PCT/JP2007/069771 filed 10 Oct. 2007, claiming priority to Japanese Patent Application No. JP 2006-277631 filed 11 Oct. 2006, the contents of which are incorporated herein by reference.

TECHNICAL FIELD

The present invention relates to a power output apparatus, as well as a control method of the power output apparatus and a vehicle equipped with the power output apparatus.

RELATED ART

One proposed configuration of a power output apparatus includes a motor constructed to output power to a driveshaft and transmit electric power to and from a dc power supply via an inverter (see, for example, Patent Document 1). The power output apparatus of this proposed configuration sets a drive limitation of the motor according to an operating condition of the inverter, so as to allow a control with taking the operating condition of the inverter into consideration.

Patent Document 1: Japanese Patent Laid-Open No. 2005-86919

DISCLOSURE OF THE INVENTION

In the power output apparatus, control for limiting actuation of the motor based on the motor temperature is generally performed to prevent a significant temperature rise of the motor. In another proposed configuration for the power output apparatus, the motor is arranged to allow heat exchange with lubricant oil used for lubricating certain mechanical parts, such as a transmission, included in the power output apparatus. In the power output apparatus of this configuration, setting the drive limitation of the motor based on only the motor temperature may fail to adequately actuate the motor.

In the power output apparatus, the control method of the power output apparatus, and the vehicle equipped with the power output apparatus, there would thus be a demand for ensuring more adequate actuation of a motor.

The present invention accomplishes at least part of the demands mentioned above and the other relevant demands by the following configurations applied to the power output apparatus, the control method of the power output apparatus, and the vehicle equipped with the power output apparatus.

According to one aspect, the invention is directed to a power output apparatus constructed to output power to a driveshaft. The power output apparatus includes: a motor arranged to allow heat exchange with at least part of a lubricating medium used for lubricating a portion of mechanical parts included in the power output apparatus and configured to output power to the driveshaft; a motor temperature detector arranged to detect a temperature of the motor; a medium temperature detector arranged to detect a temperature of the lubricating medium; a drive limitation setting module configured to set a drive limitation of the motor based on the detected temperature of the motor with consideration of the detected temperature of the lubricating medium; and a controller configured to control the motor such as to enable actuation of the motor within a range of the set drive limitation.

The power output apparatus according to this aspect of the invention controls the motor to enable actuation of the motor within the drive limitation, which is set based on the temperature of the motor with consideration of the temperature of the lubricating medium used for lubricating at least a portion of the mechanical parts included in the power output apparatus. This arrangement takes the temperature of the lubricating medium into consideration and thereby ensures more adequate actuation of the motor, compared with drive control without consideration of the temperature of the lubricating medium.

In one preferable application of the power output apparatus according to the above aspect of the invention, the drive limitation setting module sets the drive limitation in such a manner as to limit the actuation of the motor at a greater rate against higher temperature of the lubricating medium. In the power output apparatus of this application, the drive limitation setting module may set the drive limitation by adopting a gradual change process for the temperature of the lubricating medium. This arrangement effectively prevents an abrupt change in drive limitation of the motor due to an abrupt change of the temperature of the lubricating medium.

In one preferable embodiment of the invention, the power output apparatus further has a speed change-transmission assembly connected with a rotating shaft of the motor and with the driveshaft and constructed to cause an output power of the motor to be subjected to speed change and to be transmitted to the driveshaft. In this embodiment, the lubricating medium is used to lubricate a mechanical part included in the speed change-transmission assembly.

In another preferable embodiment of the invention, the power output apparatus further has: an internal combustion engine constructed to output power to the driveshaft; a three shaft-type power input output structure connected to three shafts, an output shaft of the internal combustion engine, the driveshaft, and a third shaft, and configured to input and output power to a residual shaft based on powers input from and output to any two shafts among the three shafts; and a generator constructed to input and output power from and to the third shaft. In this embodiment, the lubricating medium is used to lubricate a mechanical part included in the three shaft-type power input output structure.

According to another aspect, the invention is also directed to a vehicle including: a motor arranged to allow heat exchange with at least part of a lubricating medium used for lubricating a portion of mechanical parts included in a power output system, which is configured to output power to a driveshaft linked with an axle of the vehicle; a motor temperature detector arranged to detect a temperature of the motor; a medium temperature detector arranged to detect a temperature of the lubricating medium; a drive limitation setting module configured to set a drive limitation of the motor based on the detected temperature of the motor with consideration of the detected temperature of the lubricating medium; and a controller configured to control the motor such as to enable actuation of the motor within a range of the set drive limitation.

The vehicle according to this aspect of the invention controls the motor to enable actuation of the motor within the drive limitation, which is set based on the temperature of the motor with consideration of the temperature of the lubricating medium used for lubricating at least a portion of the mechanical parts included in the power output system configured to output power to the driveshaft linked with the axle of the vehicle. This arrangement takes the temperature of the lubricating medium into consideration and thereby ensures more adequate actuation of the motor, compared with drive control without consideration of the temperature of the lubricating medium.

In one preferable application of the vehicle according to the above aspect of the invention, the drive limitation setting module sets the drive limitation in such a manner as to limit the actuation of the motor at a greater rate against higher temperature of the lubricating medium. In the vehicle of this application, the drive limitation setting module may set the drive limitation by adopting a gradual change process for the temperature of the lubricating medium. This arrangement effectively prevents an abrupt change in drive limitation of the motor due to an abrupt change of the temperature of the lubricating medium.

In one preferable embodiment of the invention, the vehicle further has: a speed change-transmission assembly connected with a rotating shaft of the motor and with the driveshaft and constructed to cause an output power of the motor to be subjected to speed change and to be transmitted to the driveshaft. In this embodiment, the lubricating medium is used to lubricate a mechanical part included in the speed change-transmission assembly.

According to still another aspect, the invention is further directed to a control method of a power output apparatus. The power output apparatus includes a motor arranged to allow heat exchange with at least part of a lubricating medium used for lubricating a portion of mechanical parts included in a power output system that is configured to output power to a driveshaft. The control method controls the motor to enable actuation of the motor within a range of a drive limitation, which is set based on a temperature of the motor with consideration of a temperature of the lubricating medium.

The control method of the power output apparatus according to this aspect of the invention controls the motor to enable actuation of the motor within the drive limitation, which is set based on the temperature of the motor with consideration of the temperature of the lubricating medium used for lubricating at least a portion of the mechanical parts included in the power output system configured to output power to the driveshaft. This arrangement takes the temperature of the lubricating medium into consideration and thereby ensures more adequate actuation of the motor, compared with drive control without consideration of the temperature of the lubricating medium.

BRIEF DESCRIPTION OF THE DRAWINGS

FIG. 3 is a flowchart showing a drive control routine executed by a hybrid electronic control unit 70 in the embodiment;

BEST MODES OF CARRYING OUT THE INVENTION

Figure 1:
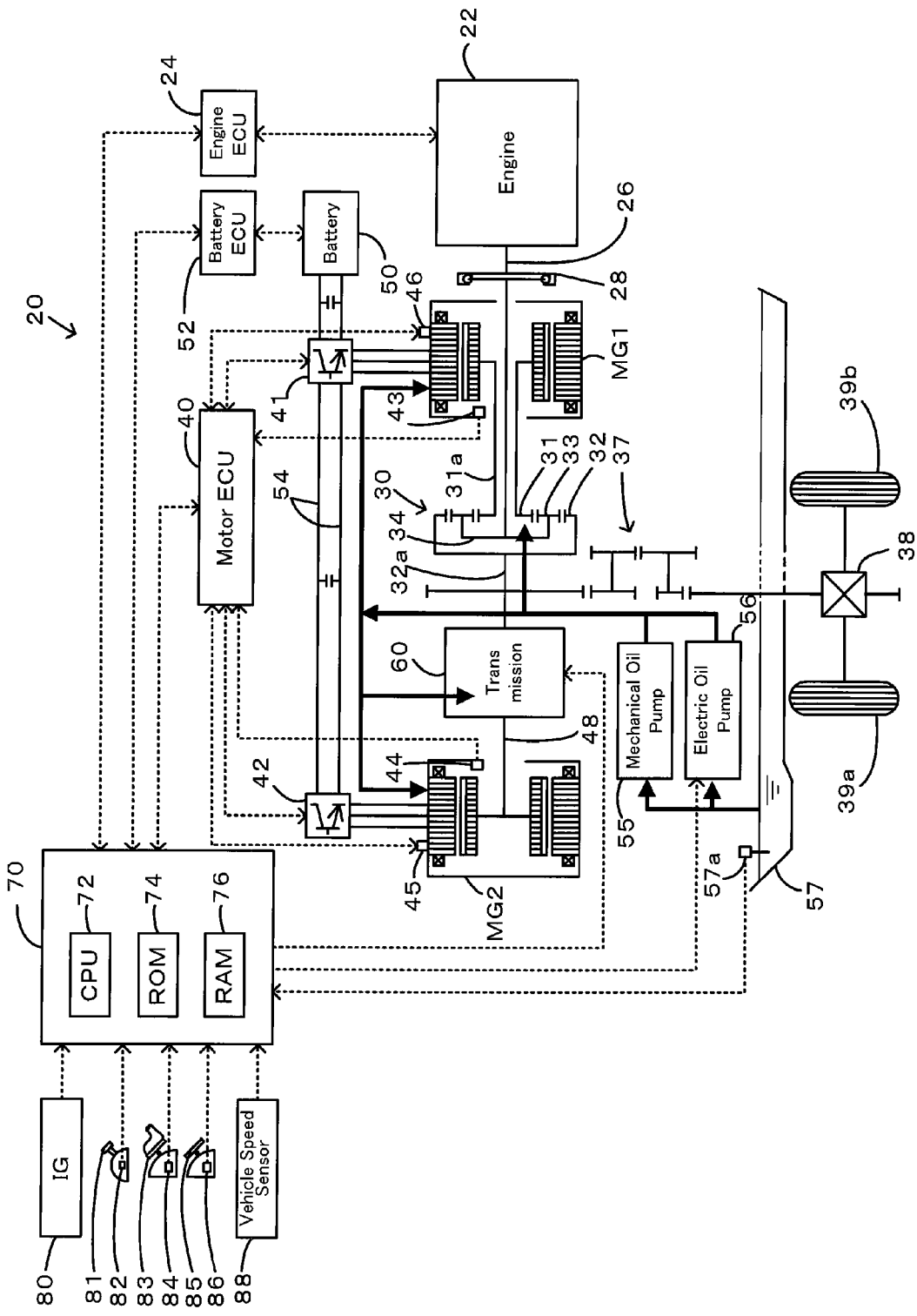
FIG. 1 schematically illustrates the configuration of a hybrid vehicle 20 equipped with a power output apparatus in one embodiment according to the invention.

One mode of carrying out the invention is described below as a preferred embodiment with reference to the accompanied drawings. FIG. 1 schematically illustrates the configuration of a hybrid vehicle 20 equipped with a power output apparatus in one embodiment according to the invention. As illustrated in FIG. 1, the hybrid vehicle 20 of the embodiment has an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a motor MG2 connected via a transmission 60 to the power distribution integration mechanism 30, a mechanical oil pump 55 and an electric oil pump 56 constructed to supply cooling lubricant oil for lubricating and cooling down mechanical parts included in the power distribution integration mechanism 30 and the transmission 60 as well as the motors MG1 and MG2, and a hybrid electronic control unit 70 configured to control the operations of the whole driving system in the hybrid vehicle 20. Thick arrows in FIG. 1 show the flows of the cooling lubricant oil supplied by the mechanical oil pump 55 and the electric oil pump 56.

The engine 22 is constructed as an internal combustion engine designed to consume a hydrocarbon fuel, such as gasoline or light oil, and thereby generate power. The engine 22 is under operation controls, such as fuel injection control, ignition control, and intake air flow control, of an engine electronic control unit 24 (hereafter referred to as engine ECU) that receives signals representing operating conditions of the engine 22 from various sensors. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the motor MG2 via the transmission 60. When the motor MG1 functions as a generator, the power of the engine 22 input via the carrier 34 is distributed to the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The ring gear 32 is mechanically connected with front drive wheels 39a and 39b via a gear mechanism 37 and a differential gear 38, so that the power output to the ring gear 32 is transmitted to the drive wheels 39a and 39b via the gear mechanism 37 and the differential gear 38. In the driving system of the hybrid vehicle 20, the three shafts linked to the power distribution integration mechanism 30 are the crankshaft 26 or the output shaft of the engine 22 connected with the carrier 34, a sun gear shaft 31a or a rotating shaft of the motor MG1 connected with the sun gear 31, and a ring gear shaft 32a or a driveshaft connected with the ring gear 32 and mechanically connected to the drive wheels 39a and 39b The motors MG1 and MG2 are constructed as known synchronous motor generators to enable operations as both a generator and a motor. The motors MG1 and MG2 are arranged to allow heat exchange with part of the cooling lubricant oil supplied to the power distribution integration mechanism 30 and the other relevant parts. The motors MG1 and MG2 transmit electric power to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of rotors in the motors MG1 and MG2 from rotational position detection sensors 43 and 44, signals representing phase currents to be applied to the motors MG1 and MG2 from current sensors (not shown), and coil temperatures Tcoil1 and Tcoil2 from temperature sensors 45 and 46 as temperatures of wound coils in the motors MG1 and MG2. The motor ECU 40 outputs switching control signals to the inverters 41 and 42. The motor ECU 40 also computes rotation speeds Nm1 and Nm2 of the motors MG1 and MG2 according to a rotation speed computation routine (not shown) based on the output signals of the rotational position detection sensors 43 and 44. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

Figure 2:
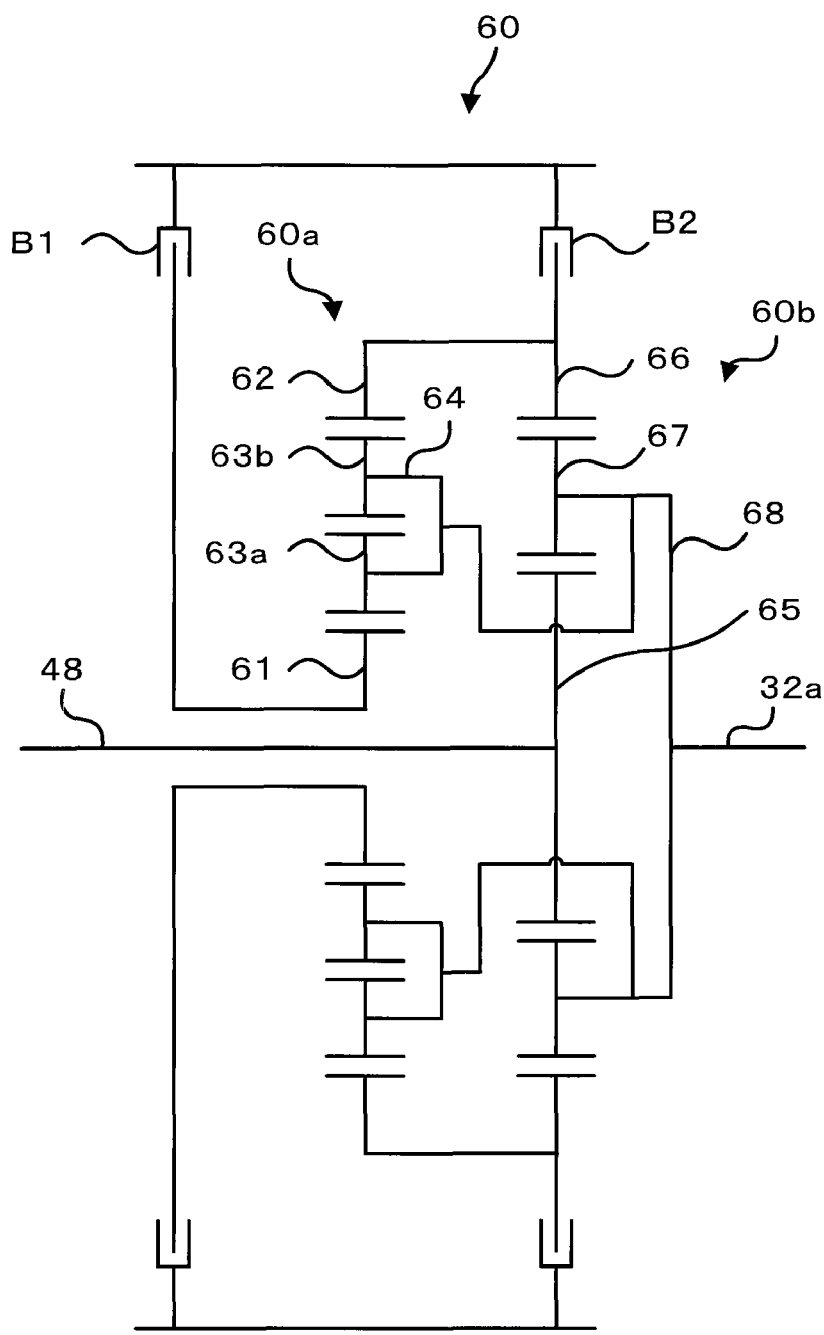
FIG. 2 illustrates the structure of a transmission 60.

The transmission 60 is constructed to couple and decouple a rotating shaft 48 of the motor MG2 with and from the ring gear shaft 32a and to change the rotation speed of the rotating shaft 48 of the motor MG2 at two different speeds in the coupled state of the two shafts and transmit the changed speed to the ring gear shaft 32a. One example of the structure of the transmission 60 is shown in FIG. 2. The transmission 60 shown in FIG. 2 includes a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gears 63a engaging with the sun gear 61, multiple second pinion gears 63b engaging with the first pinion gears 63a and with the ring gear 62, and a carrier 64 holding the multiple first pinion gears 63a and the multiple second pinion gears 63b in an interlinked manner to allow both their revolutions and their rotations on their axes. Engagement and release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 are respectively linked with the rotating shaft 48 of the motor MG2 and with the ring gear shaft 32a. Engagement and release of the brake B2 stop and allow the rotation of the ring gear 66. The double-pinion planetary gear mechanism 60a is connected with the single-pinion planetary gear mechanism 60b through linkage of the ring gear 62 with the ring gear 66 and linkage of the carrier 64 with the carrier 68. In the transmission 60, release of both the brakes B1 and B2 disconnects the rotating shaft 48 of the motor MG2 from the ring gear shaft 32a. Release of the brake B1 in combination with engagement of the brake B2 reduces the rotation of the rotating shaft 48 of the motor MG2 at a relatively high reduction ratio and transmits the significantly reduced rotation to the ring gear shaft 32a (hereafter this state is referred to as Lo gear position). Engagement of the brake B1 in combination with release of the brake B2 reduces the rotation of the rotating shaft 48 of the motor MG2 at a relatively low reduction ratio and transmits the slightly reduced rotation to the ring gear shaft 32a (hereafter this state is referred to as Hi gear position). Engagement of both the brakes B1 and B2 prohibits rotations of the rotating shaft 48 and the ring gear shaft 32a.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature from a temperature sensor (not shown) attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current measured by the current sensor, for the purpose of management and control of the battery 50.

The mechanical oil pump 55 has a rotating shaft linked with the crankshaft 26 and supplies the cooling lubricant oil, which is accumulated in an oil pan 57 actuated by rotation of the carrier 34, to the power distribution integration mechanism 30 and the other relevant parts. The electric oil pump 56 is driven with electric power supplied from an auxiliary machinery battery (not shown) and similarly supplies the cooling lubricant oil, which is accumulated in the oil pan 57, to the power distribution integration mechanism 30 and the other relevant parts. The electric oil pump 56 is driven and controlled by the hybrid electronic control unit 70.

The hybrid electronic control unit 70 is constructed as a microprocessor including a CPU 72, a ROM 74 configured to store processing programs, a RAM 76 configured to temporarily store data, input and output ports (not shown), and a communication port (not shown). The hybrid electronic control unit 70 inputs, via its input port, an ignition signal from an ignition switch 80, a gearshift position SP or a current setting position of a gearshift lever 81 from a gearshift position sensor 82, an accelerator opening Adrv corresponding to the driver's depression amount of an accelerator pedal 83 from an accelerator pedal position sensor 84, a brake pedal position BP corresponding to the driver's depression amount of a brake pedal 85 from a brake pedal position sensor 86, a vehicle speed V from a vehicle speed sensor 88, and an oil temperature Toil from a temperature sensor 57a attached to the oil pan 57. The hybrid electronic control unit 70 outputs driving signals via its output port to actuators (not shown) for the brakes B1 and B2 of the transmission 60. The hybrid electronic control unit 70 makes connection with the engine ECU 24, the motor ECU 40, and the battery ECU52 via its communication port to transmit various control signals and data to and from the engine ECU 24, the motor ECU 40, and the battery ECU 52 as mentioned previously.

The hybrid vehicle 20 of the embodiment constructed as described above sets a torque demand to be output to the ring gear shaft 32a or the driveshaft, based on the vehicle speed V and the accelerator opening Acc corresponding to the driver's depression amount of the accelerator pedal 83. The engine 22 and the motors MG1 and MG2 are controlled to be driven at efficient drive points, in order to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

The following describes the operations of the hybrid vehicle 20 of the embodiment having the configuration discussed above, especially a series of operations to restrict actuation of the motor MG2. FIG. 3 is a flowchart showing a drive control routine executed by the hybrid electronic control unit 70 in the embodiment. This drive control routine is performed repeatedly at preset time intervals (for example, at every several msec).

In the drive control routine, the CPU 72 of the hybrid electronic control unit 70 inputs various data required for control, for example, the accelerator opening Acc from the accelerator pedal position sensor 84, the vehicle speed V from the vehicle speed sensor 88, rotation speeds Nm1 and Nm2 of the motors MG1 and MG2, a charge-discharge power demand Pb*, an input limit Win and an output limit Wout of the battery 50, a gear ratio Gr of the transmission 60, the coil temperatures Tcoil1 and Tcoil2 of the wound coils in the motors MG1 and MG2, and the oil temperature Toil of the cooling lubricant oil from the temperature sensor 57a (step S100). The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The charge-discharge power demand Pb* is specified by the battery ECU 52 as an electric power to be charged into and discharged from the battery 50 based on a remaining charge or state of charge (SOC) of the battery 50 and is input from the battery ECU 52 by communication. The input limit Win and the output limit Wout of the battery 50 are set based on a battery temperature Tb and the state of charge SOC of the battery 50 and are input from the battery ECU 52 by communication. The gear ratio Gr of the transmission 60 read and input here has been set at the time of a gear change according to a change speed processing routine (not shown) and written into a specific area in the RAM 76. The coil temperatures Tcoil1 and Tcoil2 of the wound coils in the motors MG1 and MG2 are detected by the temperature sensors 45 and 46 and are input from the motor ECU 40 by communication.

Figure 4:
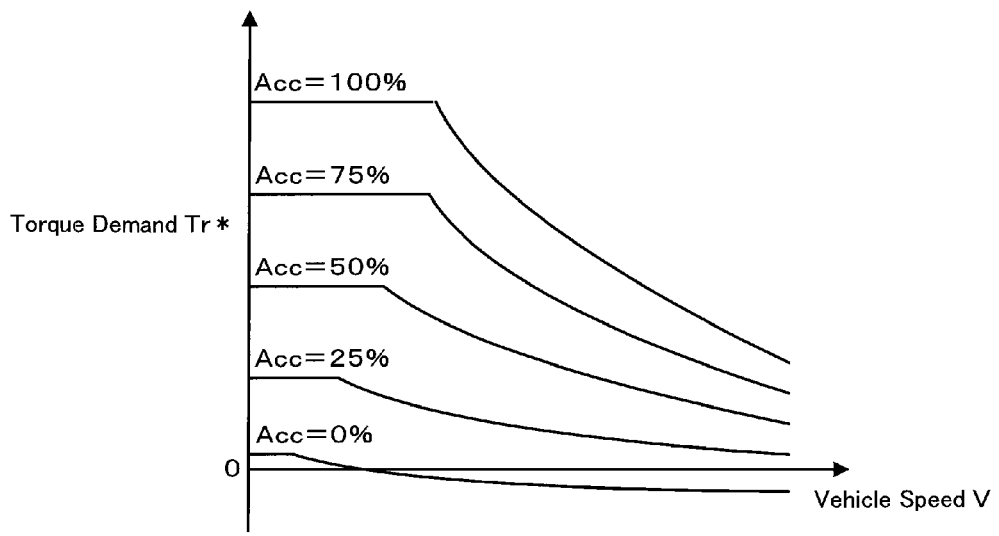
FIG. 4 shows one example of a torque demand setting map.

After the data input, the CPU 72 sets a torque demand Tr* to be output to the ring gear shaft 32a or the driveshaft linked with the drive wheels 39a and 39b as a torque required for the hybrid vehicle 20 and a power demand Pe* required for the hybrid vehicle 20, based on the input accelerator opening Acc and the input vehicle speed V (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 4. The power demand Pe* is calculated as the sum of the product of the set torque demand Tr* and a rotation speed Nr of the ring gear shaft 32a, the charge-discharge power demand Pb*, and a potential loss. The rotation speed Nr of the ring gear shaft 32a is obtained by multiplying the vehicle speed V by a preset conversion factor k or by dividing the rotation speed Nm2 of the motor MG2 by the gear ratio Gr of the transmission 60.

Figure 5:
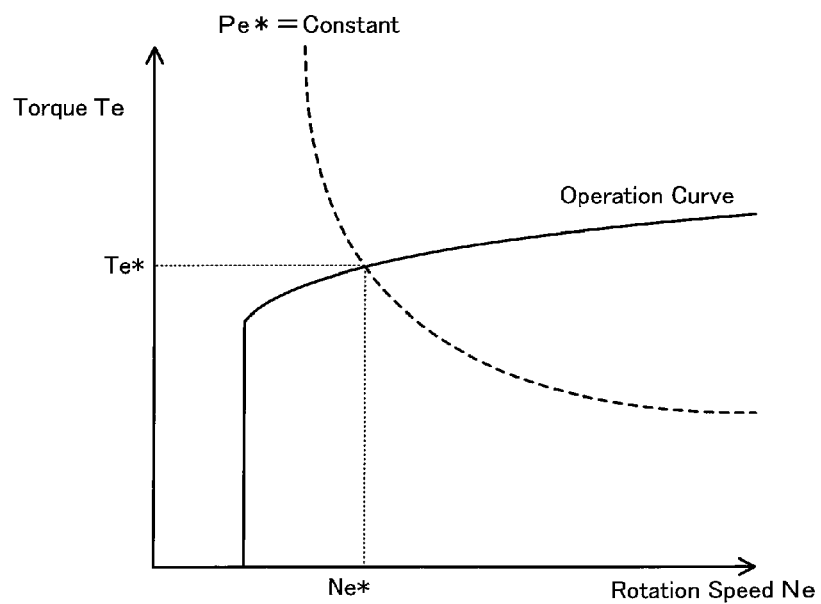
FIG. 5 shows an operation curve of an engine 22 used to set a target rotation speed Ne* and a target torque Te* of the engine 22.

A target rotation speed Ne* and a target torque Te* of the engine 22 are set, based on the set power demand Pe* (step S120). In this embodiment, the target rotation speed Ne* and the target torque Te* are determined according to an operation curve of ensuring efficient operation of the engine 22 and a curve of the power demand Pe*. FIG. 5 shows an operation curve of the engine 22 used to set the target rotation speed Ne* and the target torque Te* of the engine 22. As clearly shown in FIG. 5, the target rotation speed Ne* and the target torque Te* are given as an intersection of the operation curve and a curve of constant power demand Pe* (=Ne*×Te*).

The CPU 72 subsequently calculates a target rotation speed Nm1* of the motor MG1 from the set target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a tentative motor torque Tm1tmp of the motor MG1 from the calculated target rotation speed Nm1* and the current rotation speed Nm1 of the motor MG1 according to Equation (2) given below (step S130):

$$Nm1^* = Ne^* \cdot (1+\rho)/\rho - Nm2/(Gr \cdot \rho\rho) \quad (1)$$

$$Tm1tmp = \text{previous } Tm1^* + k1(Nm1^* - Nm1) + k2\int (Nm1^* - Nm1)dt \quad (2)$$

Figure 6:
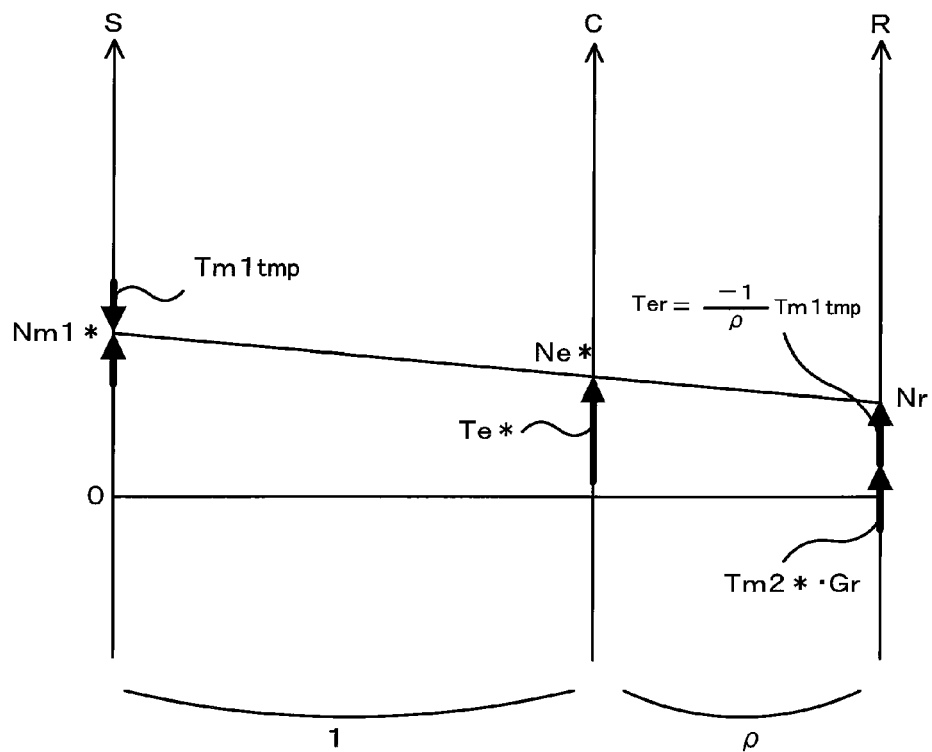
FIG. 6 is an alignment chart showing torque-rotation speed dynamics of respective rotational elements included in a power distribution integration mechanism 30.

Equation (1) is a dynamic relational expression of respective rotational elements included in the power distribution integration mechanism 30. FIG. 6 is an alignment chart showing torque-rotation speed dynamics of the respective rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the transmission 60. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

Figure 7:
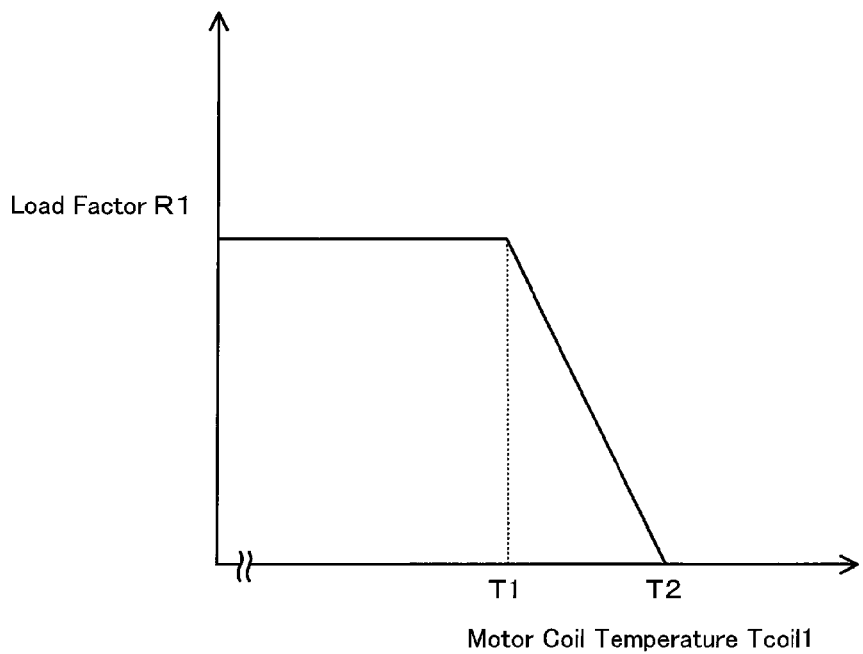
FIG. 7 shows one example of a motor MG1 load factor setting map.

The CPU 72 subsequently sets a load factor R1 of the motor MG1 (step S140) and sets the product of the tentative motor torque Tm1$tmp$ and the set load factor R1 to a torque command Tm1* of the motor MG1 (step S150). A concrete procedure of setting the load factor R1 in this embodiment provides and stores in advance a variation in load factor R1 against the coil temperature Tcoil1 of the motor MG1 as a motor MG1 load factor setting map in the ROM 74 and reads the load factor R1 corresponding to the given coil temperature Tcoil1 from the stored map. One example of the motor MG1 load factor setting map is shown in FIG. 7. As shown in this map, the load factor R1 of the motor MG1 is fixed to 100% in the range of the coil temperature Tcoil1 of not higher than a preset temperature T1 (for example, 145° C.), gradually decreases from 100% with an increase of the coil temperature Tcoil1 in the range of the coil temperature Tcoil1 over the preset temperature T1, and eventually reaches 0% at a preset temperature T2 (for example, 150° C.). Setting the load factor R1 in this manner causes actuation of the motor MG1 to be limited corresponding to the load factor R1 in the range of the coil temperature Tcoil1 exceeding the preset temperature T1. Such control effectively prevents a significant temperature rise of the motor MG1.

After calculation of the target rotation speed Nm1* and the torque command Tm1* of the motor MG1, the CPU 72 calculates a lower torque restriction Tmin and an upper torque restriction Tmax as allowable minimum and maximum torques output from the motor MG2 according to Equations (3) and (4) given below (step S160):

$$Tmin=(Win-Tm1^* \cdot Nm1)/Nm2 \quad (3)$$

$$Tmax=(Wout-Tm1^* - Nm1)/Nm2 \quad (4)$$

The lower torque restriction Tmin and the upper torque restriction Tmax are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then calculates a tentative motor torque Tm2$tmp$ to be output from the motor MG2 from the torque demand Tr*, the torque command Tm1* of the motor MG1, and the gear ratio ρ of the power distribution integration mechanism 30 according to Equation (5) given below (step S170):

$$Tm2tmp=(Tr^*+Tm1^*/\rho)/Gr \quad (5)$$

Equation (5) is readily introduced from the alignment chart of FIG. 6.

The CPU 72 subsequently performs a gradual change process to set an object oil temperature Toil* in such a manner as to allow a gentle change from the previous setting of the object oil temperature Toil* toward the oil temperature Toil input at step S100 (step S180). The gradual change process may be, for example, a rating process or a smoothing process. Setting the object oil temperature Toil* by the gradual change process effectively prevents an abrupt change of the object oil temperature Toil*.

Figure 8:
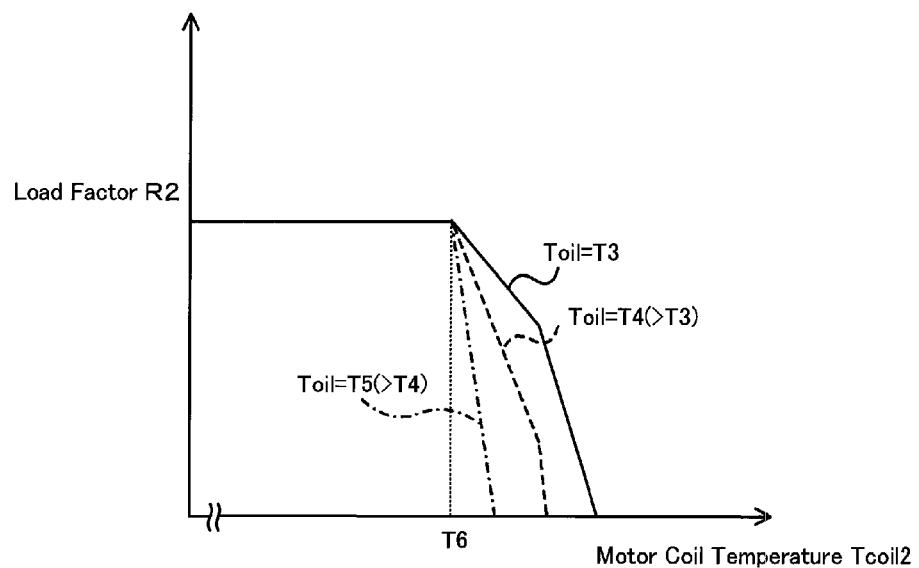
FIG. 8 shows one example of a motor MG2 load factor setting map.

After setting the object oil temperature Toil*, the CPU 72 sets a load factor R2 of the motor MG2 according to the currently set object oil temperature Toil* and the coil temperature Tcoil2 of the motor MG2 (step S190). A concrete procedure of setting the load factor R2 in this embodiment provides and stores in advance variations in load factor R2 against the coil temperature Tcoil2 with regard to various settings of the object oil temperature Toil* as a motor MG2 load factor setting map in the ROM 74 and reads the load factor R2 corresponding to the given coil temperature Tcoil2 and the given object oil temperature Toil* from the stored map. One example of the motor MG2 load factor setting map is shown in FIG. 8. A solid line curve represents a variation in load factor R2 at the object oil temperature Toil* set equal to a temperature T3 (for example, 135° C.). A broken line curve represents a variation in load factor R2 at the object oil temperature Toil* set equal to a temperature T4 (for example, 140° C.) that is higher than the temperature T3. A one-dot chain line curve represents a variation in load factor R2 at the object oil temperature Toil* set equal to a temperature T5 (for example, 145° C.) that is higher than the temperature T4. As shown in this map, the load factor R2 of the motor MG2 is fixed to 100% in the range of the coil temperature Tcoil2 of not higher than a preset temperature T6 (for example, 140° C.) irrespective of the object oil temperature Toil*, gradually decreases from 100% with an increase of the object oil temperature Toil* in the range of the coil temperature Tcoil2 over the preset temperature T6, and eventually reaches 0%. Setting the load factor R2 in this manner enables the motor MG2 to be actuated without any drive limitation in the range of the coil temperature Tcoil2 of not higher than the preset temperature T6, while causing actuation of the motor MG2 to be limited corresponding to the load factor R2 in the range of the oil temperature Tcoil2 exceeding the preset temperature T6. Such control effectively prevents a significant temperature rise of the motor MG2. The load factor R2 is set to decrease at a greater rate against the higher object oil temperature Toil* in the range of the coil temperature Tcoil2 over the preset temperature T6. The cooling lubricant oil is subjected to heat exchange with the motor MG2 as mentioned previously. The severer limitation of actuation of the motor MG2 at the higher object oil temperature Toil*, which depends upon the oil temperature Toil of the cooling lubricant oil, effectively prevents deterioration or blow-out of the cooling lubricant oil due to a temperature rise of the cooling lubricant oil. The load factor R2 of the motor MG2 is set, based on the object oil temperature Toil* determined by the gradual change process of the oil temperature Toil of the cooling lubricant oil. This arrangement desirably prevents an abrupt change of the load factor R2 of the motor MG2 accompanied by an abrupt change of the oil temperature Toil of the cooling lubricant oil.

After setting the load factor R2, the CPU 72 limits the product of the calculated tentative motor torque Tm2$tmp$ and the set load factor R2 by the calculated lower and the upper torque restrictions Tmin and Tmax to set a torque command Tm2* of the motor MG2 (step S200). Setting the torque command Tm2* of the motor MG2 in this manner restricts the torque demand Tr* to be output to the ring gear shaft 32a or the driveshaft by the load factor R2 and in the range of the input limit Win and the output limit Wout of the battery 50.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S210) and exits from the drive control routine. The engine ECU 24 receives the settings of the target rotation speed Ne* and the target torque Te* and performs required controls of the engine 22, such as fuel injection control and ignition control, to drive the engine 22 at a specific drive point defined by the combination of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. As explained above, the load factor R2 of the motor MG2 is used to set the torque command Tm2* of the motor MG2. The load factor R2 of the motor MG2 is set based on the coil temperature Tcoil2 of the motor MG2 with consideration of the oil temperature Toil of the cooling lubricant oil. This arrangement effectively prevents a significant temperature rise of the motor MG2, while preventing deterioration and blow-out of the cooling lubricant oil due to a temperature rise of the cooling lubricant oil. Compared with the prior art procedure without consideration of the oil temperature Toil of the cooling lubricant oil, the procedure of this embodiment ensures more adequate actuation of the motor MG2. The load factor R2 of the motor MG2 used to set the torque command Tm2* of the motor MG2 is based on the object oil temperature Toil* determined by the gradual change process of the oil temperature Toil of the cooling lubricant oil. This arrangement desirably prevents an abrupt change in drive limitation of the motor MG2 due to an abrupt change of the oil temperature Toil of the cooling lubricant oil.

As described above, the hybrid vehicle 20 of the embodiment sets the torque command Tm2* of the motor MG2 with the load factor R2 of the motor MG2, which is set based on the coil temperature Tcoil2 of the motor MG2 with consideration of the oil temperature Toil of the cooling lubricant oil. This arrangement effectively prevents a significant temperature rise of the motor MG2, while preventing deterioration and blow-out of the cooling lubricant oil due to a temperature rise of the cooling lubricant oil. Compared with the conventional drive control without consideration of the oil temperature Toil of the cooling lubricant oil, the arrangement of this embodiment ensures more adequate actuation of the motor MG2. The load factor R2 of the motor MG2 is set based on the object oil temperature Toil* determined by the gradual change process of the oil temperature Toil of the cooling lubricant oil. This arrangement desirably prevents an abrupt change in drive limitation of the motor MG2 accompanied with an abrupt change of the load factor R2 of the motor MG2, which is caused by an abrupt change of the oil temperature Toil of the cooling lubricant oil.

The primary elements in the embodiment and its modified examples are mapped to the primary constituents in the claims of the invention as described below. The motor MG2 arranged to allow heat exchange with at least part of the lubricant oil for lubricating the mechanical parts of the power distribution integration mechanism 30 and configured to output power to the ring gear shaft 32a or the driveshaft in the embodiment is equivalent to the 'motor' in the claims of the invention. The temperature sensor 45 arranged to detect the coil temperature of the motor MG2 in the embodiment corresponds to the 'motor temperature detector' in the claims of the invention. The temperature sensor 57a arranged to detect the oil temperature of the cooling lubricant oil in the embodiment corresponds to the 'medium temperature detector' in the claims of the invention. The hybrid electronic control unit 70 executing the processing of step S190 in the drive control routine of FIG. 3 in the embodiment is equivalent to the 'drive limitation setting module' in the claims of the invention. The processing of step S190 sets the load factor R2 of the motor MG2 based on the detected coil temperature Tcoil2 of the motor MG2 with consideration of the detected oil temperature Toil of the cooling lubricant oil. The hybrid electronic control unit 70 executing the processing of step S200 to set the motor torque command Tm2* and the processing of step S210 to send the set motor torque command Tm2* to the motor ECU 40 in the drive control routine of FIG. 3 in the embodiment is equivalent to the 'controller' in the claims of the invention. The processing of step S200 sets the motor torque command Tm2* to the product of the load factor R2 and the tentative motor torque Tm2tmp, which is calculated as the torque to be output from the motor MG2 from the torque demand Tr*, the motor torque command Tm1*, and the gear ratio ρ of the power distribution integration mechanism 30. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

The hybrid vehicle 20 of the embodiment sets the load factor R2 of the motor MG2 based on the object oil temperature Toil* determined by the gradual change process of the oil temperature Toil of the cooling lubricant oil detected by the temperature sensor 57a. One modified procedure may set the load factor R2 of the motor MG2 directly based on the oil temperature Toil of the cooling lubricant oil detected by the temperature sensor 57a, as long as an abrupt change in actuation of the motor MG2 is allowable. In the configuration of the embodiment, the cooling lubricant oil is used to lubricate and cool down the power distribution integration mechanism 30, the motor MG2, and the other relevant parts. The cooling lubricant oil is, however, not restrictive but may be replaced by any other medium that can lubricant and cool down the power distribution integration mechanism 30, the motor MG2, and the other relevant parts.

The hybrid vehicle 20 of the embodiment sets the load factor R1 of the motor MG1 without consideration of the oil temperature Toil of the cooling lubricant oil. One modified procedure may set the load factor R1 of the motor MG1 with consideration of the oil temperature Toil of the cooling lubricant oil, as long as a variation in rotation speed of the engine 22 is allowable. In this modification, the load factor R1 is preferably set to decrease with an increase of the oil temperature Toil.

Figure 9:
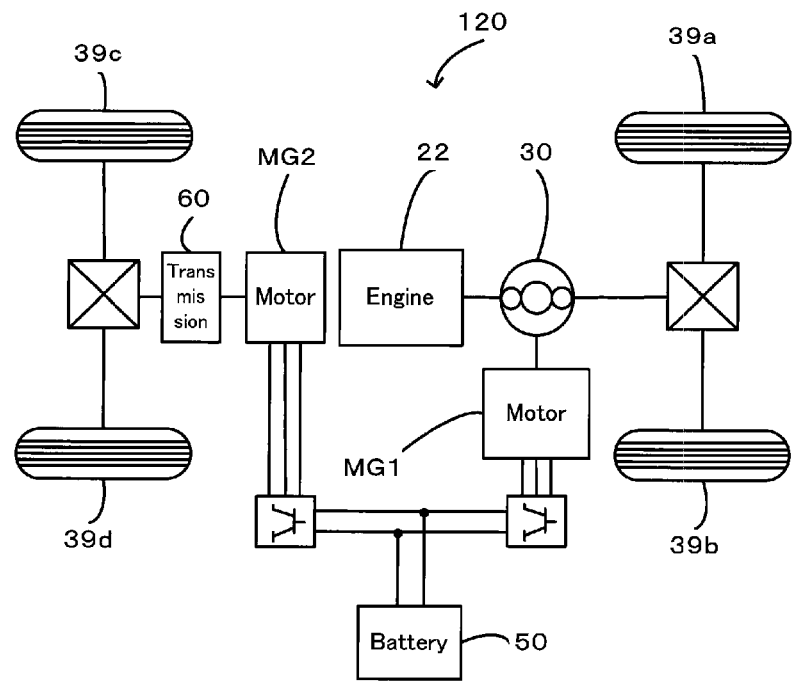
FIG. 9 schematically illustrates the configuration of another hybrid vehicle 120 in one modified example.

In the hybrid vehicle 20 of the embodiment, the power of the motor MG2 is subjected to speed change in the transmission 60 and is output to the ring gear shaft 32a. The technique of the invention is also applicable to a hybrid vehicle 120 of a modified structure shown in FIG. 9. In the hybrid vehicle 120 of FIG. 9, the power of the motor MG2 goes through the speed change by the transmission 60 and is connected to another axle (an axle linked with wheels 39c and 39d) that is different from the axle connecting with the ring gear shaft 32a (the axle linked with the drive wheels 39a and 39b).

Figure 10:
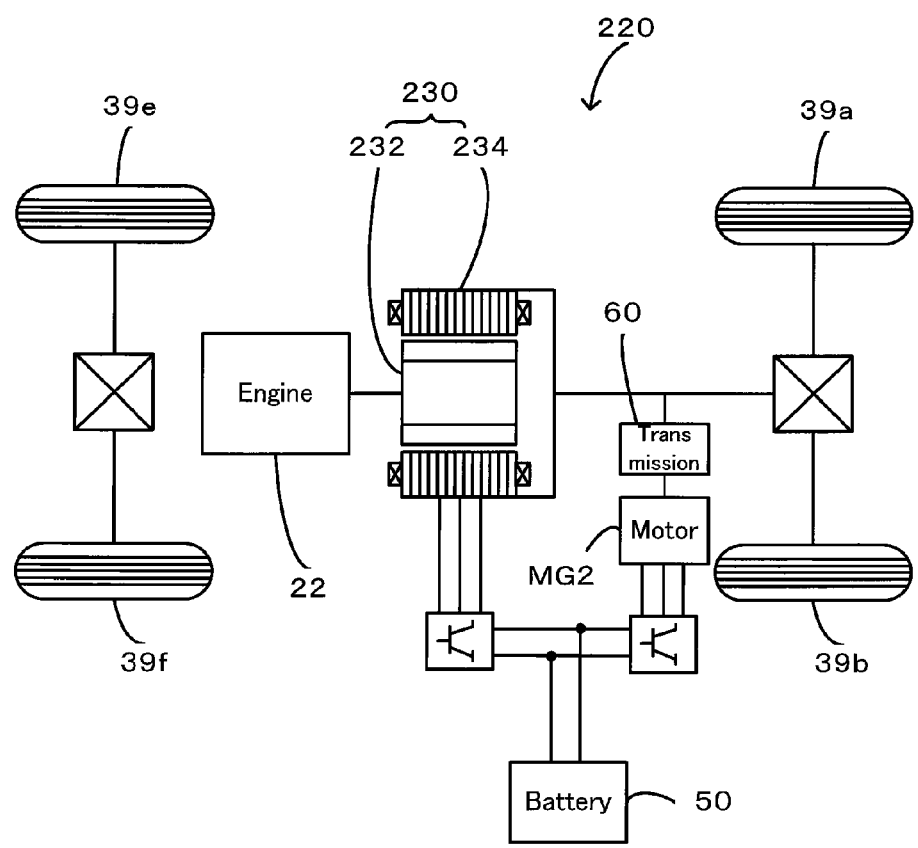
FIG. 10 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 39a and 39b. The technique of the invention is also applicable to a hybrid vehicle 220 of another modified structure shown in FIG. 10. The hybrid vehicle 220 of FIG. 10 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 39a and 39b. The pair-rotor motor 230 transmits part of the output power of the engine 22 to the driveshaft, while converting the residual engine output power into electric power.

In the hybrid vehicle 20 of the embodiment, the power of the motor MG2 is output to the ring gear shaft 32a or the driveshaft via the transmission 60. One modified structure may not include the transmission 60 and may directly output the power of the motor MG2 to the ring gear shaft 32a or the driveshaft.

The above embodiment regards the hybrid vehicle driven with the power of the engine 22 and the motor MG2 output to the axle. The principle of the invention is applicable to a vehicle of any other configuration with a motor for outputting power to its axle, for example, an electric vehicle driven with the power of only a motor output to its axle. The hybrid vehicle 20 equipped with the power output apparatus has been described in the above embodiment. The technique of the invention may be actualized by diversity of other applications, for example, a power output apparatus including the engine 22, the power distribution integration mechanism 30, the motors MG1 and MG2, the battery 50, and the hybrid electronic control unit 70, as well as a control method of the hybrid vehicle 20 and a control method of such a power output apparatus.

The best mode for carrying out the present invention has been described using the embodiment, but the present invention is not limited to the embodiment and may be, of course, carried out in various modes without departing from the gist of the present invention.

INDUSTRIAL APPLICABILITY

The technique of the present invention is preferably applied to the manufacturing industries of the power output apparatuses and the vehicles.

The invention claimed is:

1. A power output apparatus constructed to output power to a driveshaft, the power output apparatus comprising:
   a motor arranged to allow heat exchange with at least part of a lubricating medium used for lubricating a portion of mechanical parts included in the power output apparatus and configured to output power to the driveshaft;
   a motor temperature detector arranged to detect a temperature of the motor;
   a medium temperature detector arranged to detect a temperature of the lubricating medium;
   a load factor setting module configured to set a load factor that is a ratio of an allowable torque actually output from the motor to a target torque to be output from the motor, in a case that the detected temperature of the motor is not more than a predetermined motor threshold temperature, so that the target torque is not limited but is output from the motor irrespective of the detected temperature of the lubricating medium, while setting the load factor, in a case that the detected temperature of the motor is more than the motor threshold temperature, in such a manner as to decrease more with the detected temperature of the motor being higher and in such a manner as to enlarge more a degree of decreasing with the detected temperature of the lubricating medium being higher; and
   a controller configured to control the motor so that a torque calculated as the product of the target torque and the load factor is output from the motor.

2. The power output apparatus in accordance with claim 1, wherein the load factor setting module sets the load factor by adopting a gradual change process for the temperature of the lubricating medium.

3. The power output apparatus in accordance with claim 1, the power output apparatus further having:
   a speed change-transmission assembly connected with a rotating shaft of the motor and with the driveshaft and constructed to cause an output power of the motor to be subjected to speed change and to be transmitted to the driveshaft,
   wherein the lubricating medium is used to lubricate a mechanical part included in the speed change-transmission assembly.

4. The power output apparatus in accordance with claim 1, the power output apparatus further having:
   an internal combustion engine constructed to output power to the driveshaft;
   a three shaft-type power input output structure connected to three shafts, an output shaft of the internal combustion engine, the driveshaft, and a third shaft, and configured to input and output power to a residual shaft based on powers input from and output to any two shafts among the three shafts; and
   a generator constructed to input and output power from and to the third shaft,
   wherein the lubricating medium is used to lubricate a mechanical part included in the three shaft-type power input output structure.

5. The power output apparatus in accordance with claim 4, the power output apparatus further having:
   an engine target value setting module configured to set a power demand required to the driveshaft based on a torque demand to be output to the driveshaft, and set a target engine rotation speed and a target engine torque as a rotation speed and a torque on an operation curve defining a relation between a rotation speed and a torque of the internal combustion engine to ensure efficient operation of the internal combustion engine and as a rotation speed and a torque for outputting the set power demand from the internal combustion engine;
   an generator target value setting module configured to set a target generator torque to be output from the generator for rotating the internal combustion engine at the set target engine rotation speed; and
   an generator load factor setting module configured to set a generator load factor that is a ratio of an allowable torque actually output from the generator to the target generator torque, in a case that a temperature of the generator is not more than a predetermined generator threshold temperature, so that the set target generator torque is not limited but is output from the generator irrespective of the detected temperature of the lubricating medium, while setting the generator load factor, in a case that the temperature of the generator is more than the generator threshold temperature, in such a manner as to decrease more with the temperature of the generator being higher irrespective of the detected temperature of the lubricating medium, wherein the generator is arranged to allow heat exchange with part of the lubricating medium, the target torque to be output from the motor is a torque to be output from the motor for outputting the torque demand to the driveshaft, and the controller controls the internal combustion engine, the generator and the motor so that the internal combustion engine is operated at an operation point decided by the set target engine rotation speed and the set target engine torque, and a torque calculated as the product of the target generator torque and the set generator load factor is output from the generator, while a torque calculated as the product of the target torque and the set load factor is output from the motor.

6. A vehicle, equipped with the power output apparatus in accordance with claim 1, an axle of the vehicle being linked with the driveshaft.

7. A control method of a power output apparatus that is configured to output power to a driveshaft, the power output apparatus including a motor arranged to allow heat exchange with at least part of a lubricating medium used for lubricating a portion of mechanical parts included in the power output apparatus and configured to output power to a driveshaft, the control method comprising:

setting a load factor that is a ratio of an allowable torque actually output from the motor to a target torque to be output from the motor, in a case that a temperature of the motor is not more than a predetermined motor threshold temperature, so that the target torque is not limited but is output from the motor irrespective of a temperature of the lubricating medium, while setting the load factor, in a case that the temperature of the motor is more than the motor threshold temperature, in such a manner as to decrease more with the detected temperature of the motor being higher and in such a manner as to enlarge more a degree of decreasing with the temperature of the lubricating medium being higher; and controlling the motor so that a torque calculated as the product of the target torque and the load factor is output from the motor.

* * * * *